US008458491B1

(12) United States Patent
Powell et al.

(10) Patent No.: US 8,458,491 B1
(45) Date of Patent: Jun. 4, 2013

(54) CRYPTOGRAPHICALLY SCRUBBABLE STORAGE DEVICE

(75) Inventors: Carl Marshall Eliot Powell, Gaithersburg, MD (US); John-Francis Mergen, Baltimore, MD (US); John G. Griffith, III, Mont Vernon, NH (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 365 days.

(21) Appl. No.: 12/821,275

(22) Filed: Jun. 23, 2010

(51) Int. Cl.
*G06F 11/30* (2006.01)

(52) U.S. Cl.
USPC .......................................... 713/190

(58) Field of Classification Search
USPC .......................................... 713/190
See application file for complete search history.

(56) References Cited

U.S. PATENT DOCUMENTS 7,330,970 B1* 2/2008 Field ............................ 713/165
2008/0235809 A1* 9/2008 Weinstein et al. .............. 726/28

* cited by examiner

*Primary Examiner* — Jacob Lipman
(74) *Attorney, Agent, or Firm* — Chapin IP Law, LLC (57) ABSTRACT

A cryptographically scrubbable disk performs erasure of a cryptographic key covering a body of data to render the body of data unintelligible. A scrub controller interfaced between a computing appliance and a storage volume generates a scrub key and encrypts each block of data written to the storage volume using the scrub key. Data read commands decrypt using the same key. The scrub controller is an electronically separate conduit having independent memory and power, thus the scrub key remains within the scrub controller and unexposed, and is thus inaccessible via the processor of the computing appliance. The scrub key remains in the scrub controller such that the scrub key never leaves the scrub controller and is also inaccessible to retrieval since the scrub controller does not share memory or access with the computer and is thus electronically separate from the supported computing appliance.

16 Claims, 8 Drawing Sheets

CRYPTOGRAPHICALLY SCRUBBABLE STORAGE DEVICE

STATEMENT OF FEDERALLY SPONSORED RESEARCH AND DEVELOPMENT

The subject matter of this patent application was developed, in whole or in part, under contract No. HR0011-09-C-0038. The government has certain rights in the subject matter claimed herein.

BACKGROUND

As early as 1965, exponential growth of computer technology was recognized by Gordon E. Moore, cofounder of Intel® corporation, who suggested that computer processing power will double roughly every 18 months. This prediction became known as Moore's law, and while the exact teachings and implications of it have been debated, it has remained remarkably accurate, more or less, for decades. In the case of non volatile mass storage, typically disk drives, storage capability continues to grow at exponential rates.

The modern implications of such growth is that vast amounts of information may feasibly be stored on a device as small and portable as a PC, laptop, or even a cellphone. Disk drives that once resembled a washing machine in size are now outperformed by a 2.5 inch laptop disk. The availability of such extensive data storage, however, may create an equally extensive task when that data needs to be deleted. Certain contexts require deletion of sensitive data, due to security or privacy concerns, for example, and also impose a need for verification of such deletion. Such deletion therefore presents a nontrivial matter with large quantities of data.

SUMMARY

Conventional mass storage is performed by magnetic media, typically a hard disk, although flash memory and ram disks are gaining in popularity as primary mass storage for computer systems. Deletion of data is typically performed merely by marking storage areas as available, and the actual information remains intact until physically overwritten by the file system upon a need to reclaim the space (i.e. a write request by a software application). Therefore, conventional deleted information still remains fixed in a tangible medium, and may still be read by appropriate techniques.

Obliteration of the data on a storage volume involves rendering the data unintelligible. Scenarios that give rise to the need to obliterate the data include a tactical, or military environment where a piece of equipment (aircraft, UAV, communications equipment) is in eminent danger of capture or abandonment, and in non-tactical situations such as when a storage volume is redeployed for a different use. In an office environment, for example, when computing devices such as PCs and laptops may be reassigned to different personnel, data on the storage volume is obliterated such that the new user cannot access data of the former user. This is particularly important when a computing appliance is redeployed from classified to non-classified use.

Configurations herein are based, in part, on the observation that scrubbing a storage volume of electronically stored data, typically on a magnetic or optical medium, is difficult to accomplish in a complete, verifiable, and expedient manner. It would be beneficial to provide a mechanism for performing a complete obliteration, or scrubbing, of the data on a storage volume such as a disk in an expedient manner.

Obliteration of data on a storage volume to effect permanent deletion of data stored thereon is a process known as "scrubbing." Conventional scrubbing procedures include overwriting the entire media surface, physically grinding the media surface, or in tactical situations detonating a layer of thermite previously applied in anticipation of expedient destruction. Unfortunately, conventional scrubbing approaches suffer from the shortcoming that physical erasure is time-consuming and can leave detectable traces, and physical destruction renders the physical storage medium unusable. Further, in military applications such as aircraft, excessive quantities of volatile substances such as thermite are undesirable.

Configurations herein are further based on the observation that erasure of a cryptographic key covering a body of data renders that body of data unintelligible, particularly if the erased key is the sole copy. A scrub controller interfaced between a computing appliance and a storage volume generates a scrub key and encrypts each block of data written to the storage volume using the scrub key. Data read commands decrypt using the same key. The scrub controller is an electronically separate conduit having independent memory and power, thus the scrub key remains within the scrub controller and unexposed, and is thus inaccessible via the processor of the computing appliance. Therefore, the scrub key never leaves the scrub controller and is also inaccessible to retrieval since the scrub controller does not share memory or access with the computer and is thus electronically separate from the supported computing appliance The storage volume is scrubbed by overwriting only the scrub key, effectively obliterating data encrypted with it on the storage volume. An indicator number, generated with each deployment of the storage volume, is also written with each encrypted block to further identify each deployment instantiation should the encryption fail. In this manner, the scrub controller rapidly obliterates information stored on a storage volume without exhaustive physical overwrites, destroying or damaging the storage volume such that it may be reused for additional deployment cycles.

The indicator number provides a sort of "baseline" that complements the encryption. Since, unlike a public key authentication, there is no comparison to be made, a decryption with an incorrect key simply results in a double encrypted block of data. The indicator number provides a sanity check and additional assurance, such that the scrub controller may also "zero" the data block if the decrypted indicator number does not match, rather than simply returning unintelligible data.

In further detail, the cryptographically scrubbable storage device performs a method for scrubbing a storage volume, in which the storage volume provides data storage support for a computing appliance. A scrub controller disposed between the computing appliance and the storage device identifies a scrub key for cryptographically enciphering data stored on the storage volume. The scrub key is responsive to a rekey signal indicative of a need to delete the enciphered data. The method stores the scrub key separate from a memory space of a processor supporting the computing appliance, rendering the scrub key inaccessible through instructions executed by the processor. The scrub controller responds to input/output (I/O) requests from the supported computing appliance, in which the I/O requests are for reading or writing blocks of the data stored on the storage volume. At some point during normal operation, the scrub controller detects when the rekey signal has been issued, and in response to detecting the rekey signal, erases the scrub key such that the enciphered data stored on the storage volume remains enciphered, in which that the enciphered data requiring substantial computing resources to decrypt without the scrub key. Based on the strength of the underlying encryption mechanism for enciphering the data, the data on the storage volume is effectively deleted in that it is rendered unintelligible and unrecoverable without the sole deleted scrub key.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A cryptographically scrubbable storage device, such as a cryptographically scrubbable disk, allows purging of a storage volume such that previously stored information is no longer accessible. Such "scrubbing" provides assurances against discovery by unconventional means, such as sector based reads that elude conventional file systems. In a redeployment situation, scrubbing relieves the disclosure risk of previously stored sensitive information without physically damaging the storage medium. Scrubbing also provides an effective alternative to physical obliteration of the storage medium in the event of possible compromise. In a tactical situation, cryptographic scrubbing provides a non-volatile alternative to physically destructive methods for assuring that abandoned or captured devices cannot yield confidential information. Configurations depicted below disclose an example operational scenario of a scrub controller operating in conjunction with a computing appliance, such as a PC or laptop, and an appurtenant storage device responsive to the scrub controller for performing normal operation of the computing appliance subject to cryptographic scrubbing as described further below. The illustrated configurations are an example; other computing devices and digital mediums may also be employed for implementing the claimed system.

Depicted below is an example arrangement of a cryptographically scrubbable disk according to the principles disclosed herein. Various portions and components may take other forms in alternate configurations without departing from the claimed approach. A computing appliance, such as a laptop, PC, PDA or other suitable processor driven device, employs a mass storage device, or storage volume, as a peripheral subsystem for transferring data for storage and retrieval. In a typical arrangement this takes the form of a disk drive as the storage volume attached to a PC platform via an input/output (I/O) bus, however other suitable storage devices, such as flash memory or a ram disk, may be employed as the storage volume. The scrub controller operates between the computing appliance and the storage device by interfacing with the I/O bus, effectively handling all commands from the computing appliance to the storage device. The computing appliance issues commands to read and write blocks of data, typically 512 bytes however alternate sizes may be employed, and the scrub controller directs the storage volume to store and retrieve the corresponding data. As will be detailed further below, the blocks of data have an appurtenant indictor number for each block, and may employ a limited command set for performing only reads and writes, avoiding inquires and status requests which may compromise the integrity of the scrub controller.

Figure 1:
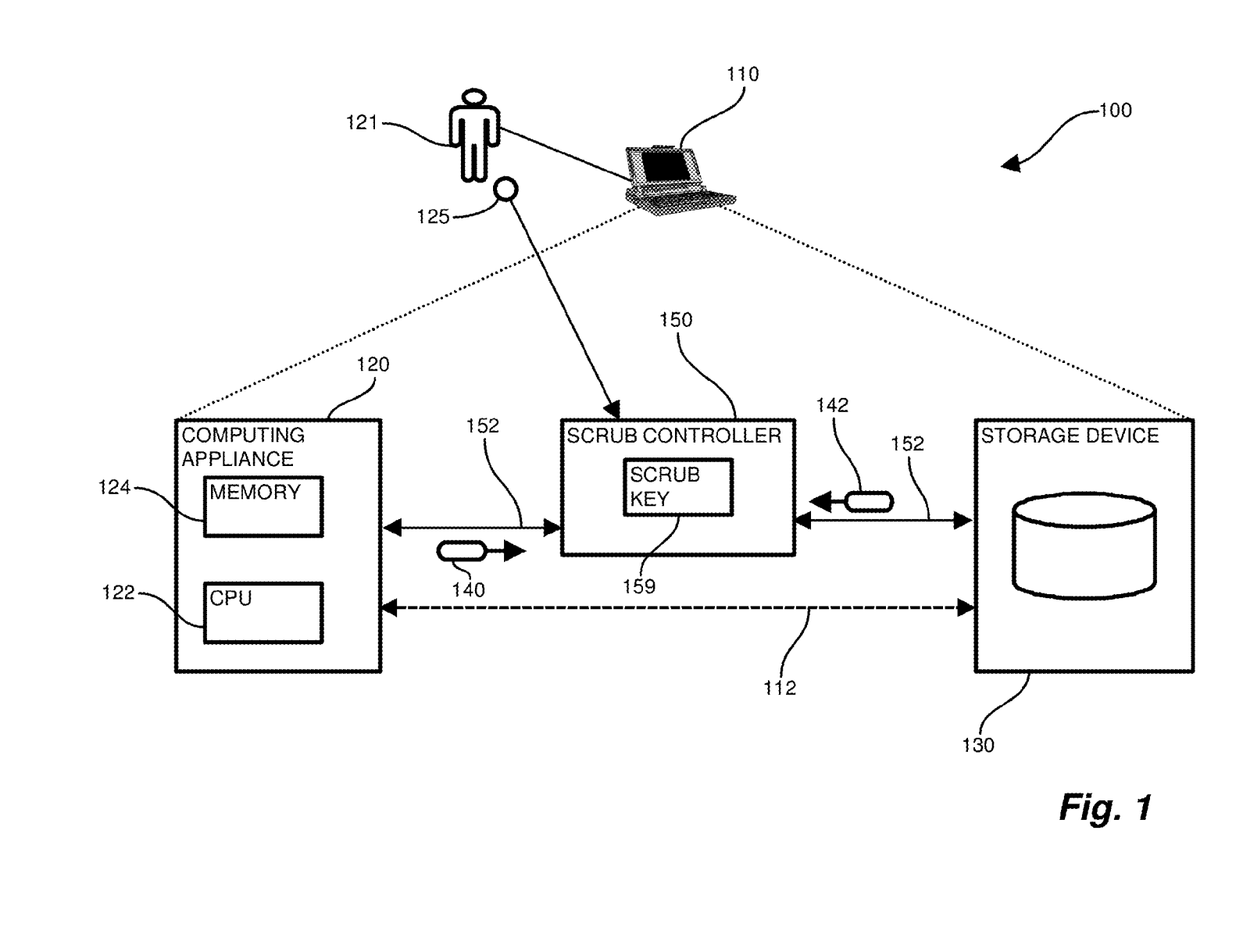
FIG. 1 is a context diagram of a computing environment suitable for use with the present invention.

FIG. 1 is a context diagram of a managed information environment suitable for use with the present invention. Referring to FIG. 1, a computing environment 100 includes a computing device 110, such as a desktop PC, laptop, PDA, or other suitable device having a storage component (device) such as a disk drive, flash memory, ram disk, or other solid state or physical storage. The computing device 110 is defined by a computing appliance 120 responsive to a task or user 121, including a processor 122 and memory 124, and a storage device 130 such as a disk drive. In the course of operation, the computing appliance 120 issues commands 140 to the storage device 130 for data maintenance. The commands 140 are typically for storing and retrieving data, although other commands such as status and configuration requests, may also occur. Conventional computing devices perform storage commands via a motherboard or system bus 112; configurations herein insert a scrub controller 150 between the computing appliance 120 and the storage device 130 via an interface 152.

Figure 2:
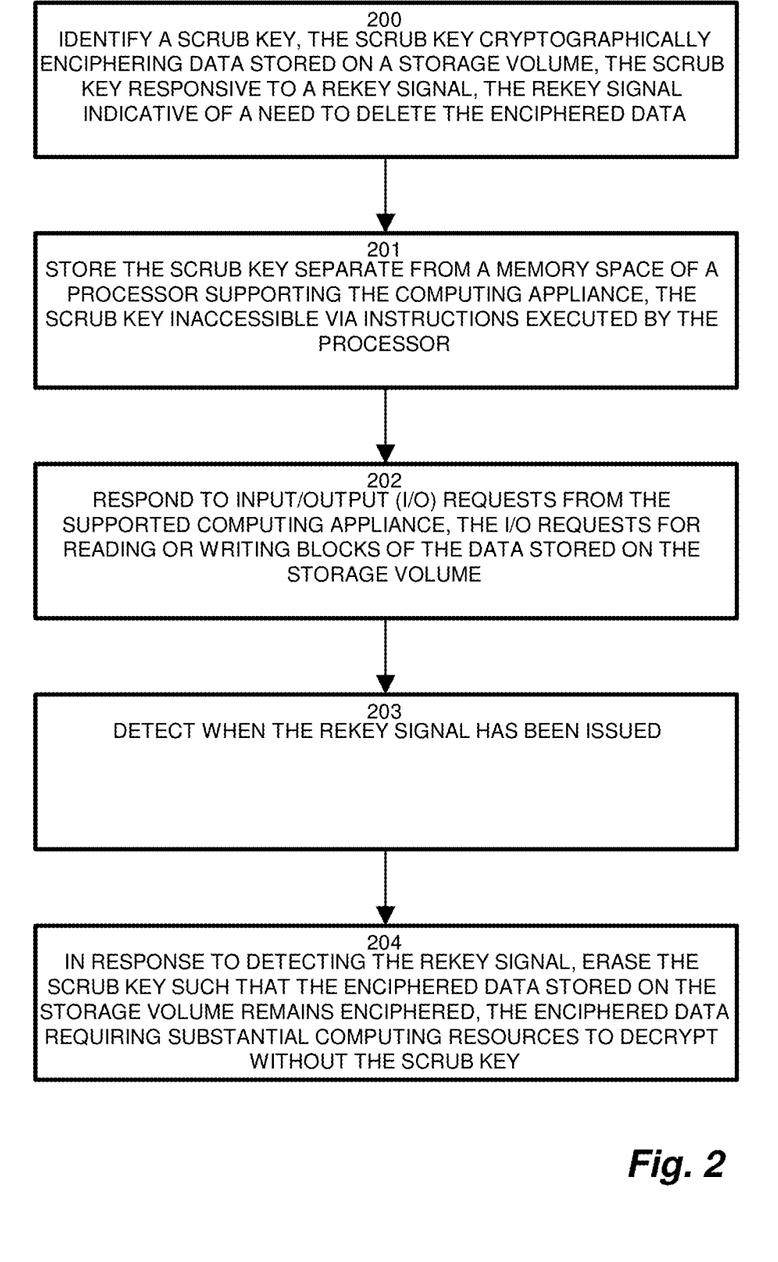
FIG. 2 is a flowchart of storage volume scrubbing in the environment of FIG. 1.

In response to the commands 140, the storage device issues responses 142 satisfying the request. The interface 152 emulates the commands and responses previously provided via the bus 112 such that the scrub controller 150 is transparent to the computing appliance 120 and storage device 130, however the scrub controller encrypts data in requests 140 using a scrub key 159, and similarly decrypts retrieval responses 142. In an example arrangement, the scrub controller 150 is physically disposed in the same cabinet or case as the computing appliance 120 and the storage device, and scrutinizes all traffic (commands, responses 140,142) between the computing appliance 120 and storage device 130. The scrub controller 150 continues performing transparent servicing requests 140, 142 until the controller 150 receives a rekey signal 125 from the user 121 or other source indicating a need to scrub the storage device 130 and delete the data stored thereon FIG. 2 is a flowchart of storage volume scrubbing in the environment of FIG. 1. Referring to FIGS. 1 and 2, the method of cryptographically scrubbing a storage volume providing data storage support for a computing appliance 120 includes identifying a scrub key. The scrub key 159 (FIG. 3, below) is invoked for cryptographically enciphering data stored on a storage volume such as a disk drive 130 of a PC, laptop or other suitable computing appliance. The scrub key 159 is responsive to the rekey signal 125 indicative of a need to delete the enciphered data on the storage volume for redeployment of the storage device 130, mitigating risk of capture or discovery, or other need for verifiable deletion, as depicted at step 200. The scrub controller 150 stores the scrub key 159 separate from a memory space 124 of the processor 122 supporting the computing appliance 120, so that the scrub key 159 remains inaccessible via instructions executed by the processor 122, as disclosed at step 201, thus programs running on the supported computing appliance 120, including covert malware, cannot access, manipulate or affect the scrub key 159.

In an ongoing manner during normal operation, the scrub controller 150 responds to input/output (I/O) requests 140 from the supported computing appliance 120, in which the I/O requests 140 are for reading or writing blocks of the data stored on the storage volume 132 (FIG. 3), as depicted at step 202. Upon a threat of compromise, need for redeployment, or other need to commence scrubbing, the user 121 issues the rekey signal 125. The rekey signal 125 may be an external toggle switch, push button, or automated or semi-automated signal. However, since the scrub controller 150 maintains separate memory and power resources, the rekey signal 125 remains independent of operation of the supported computing appliance 120. The scrub controller 150 detects when the rekey signal 125 has been issued, as disclosed at step 203, and in response to detecting the rekey signal 125, erases the scrub key 159 such that the enciphered data stored on the storage volume 132 in the storage device 130 remains enciphered, as depicted at step 204. In accordance with the encryption mechanism employed, the enciphered data requires substantial computing resources to decrypt without the scrub key 159, such that the storage volume 132 is rendered unintelligible and the data stored thereby effectively unrecoverable.

Figure 3:
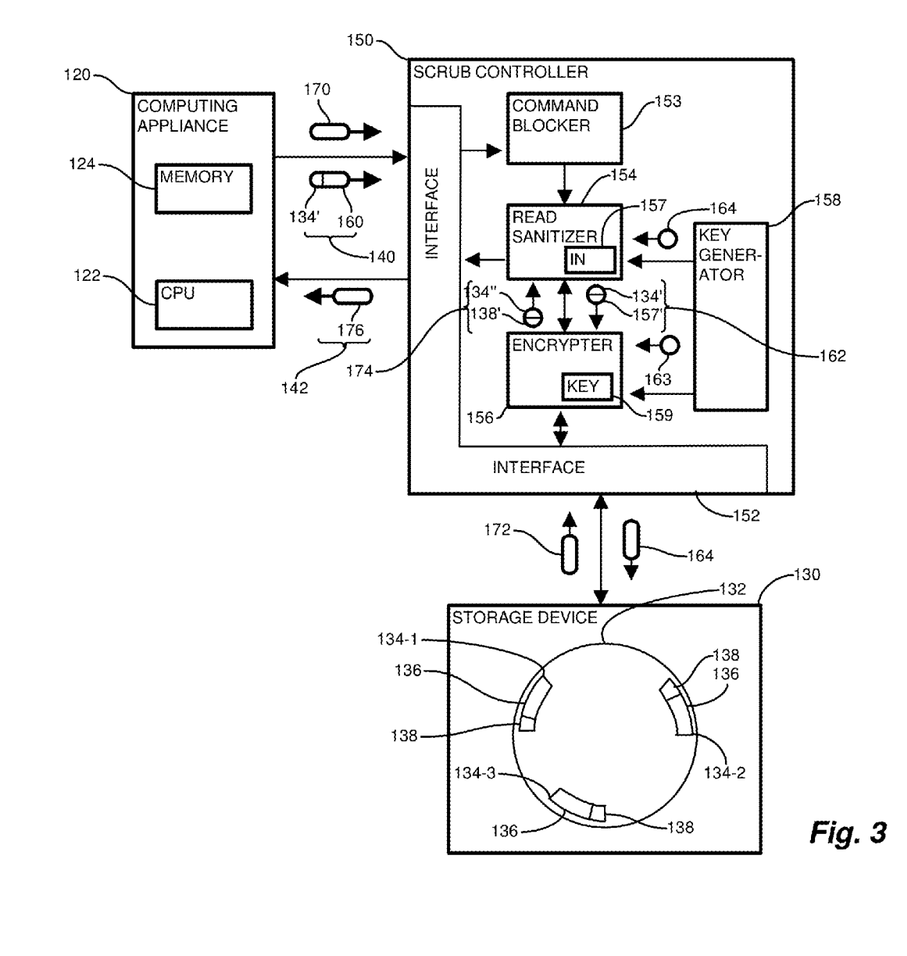
FIG. 3 is a block diagram of a computing device employing the scrub controller interfaced between a storage volume and a computing appliance.
Figure 4:
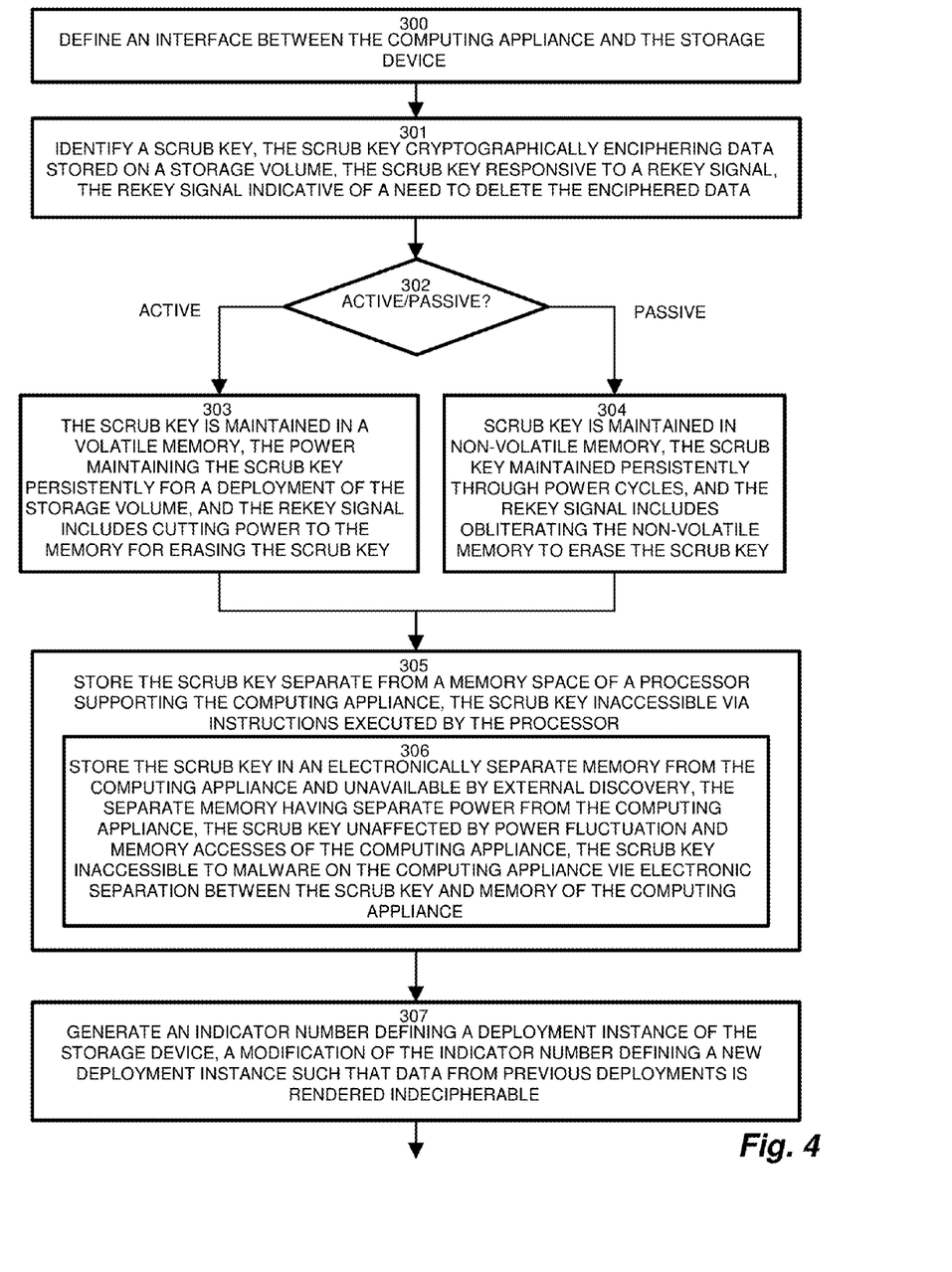
FIGS. 4-8 are a flowchart of the scrub controller performing data access in anticipation of a scrub operation.
Figure 5:
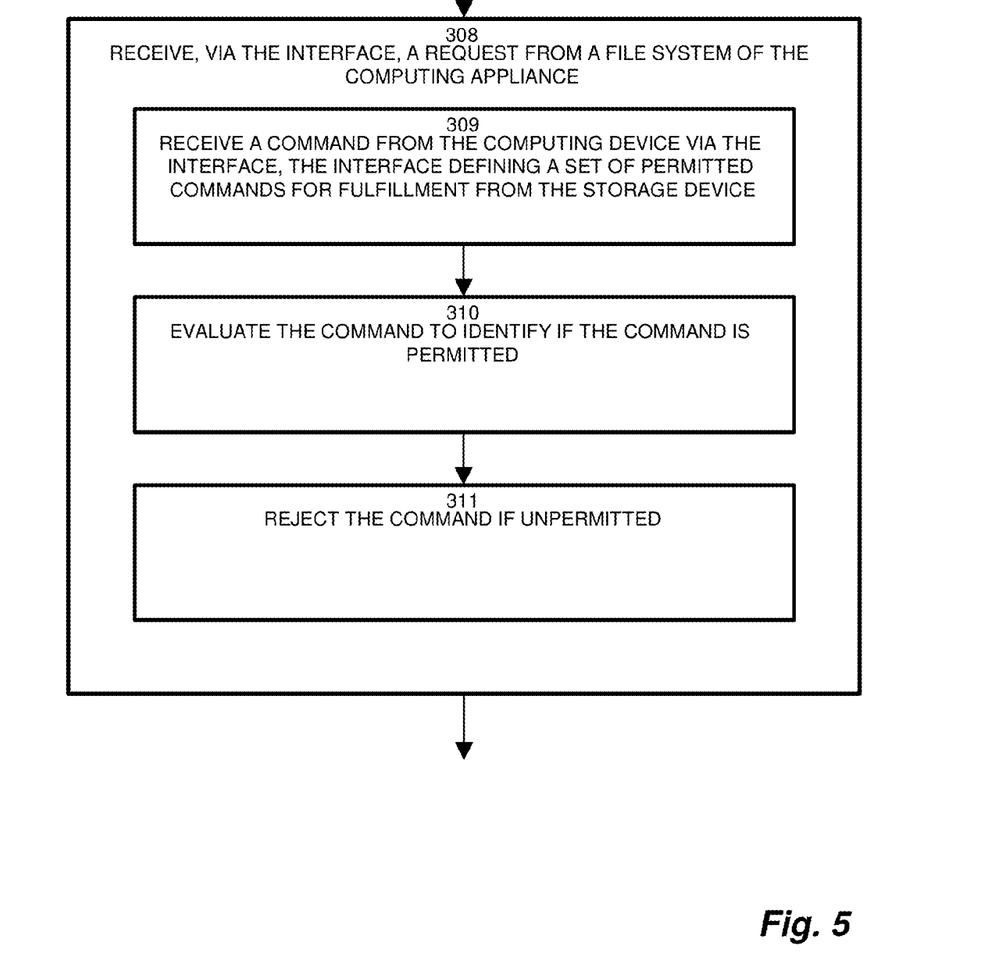
Figure 6:
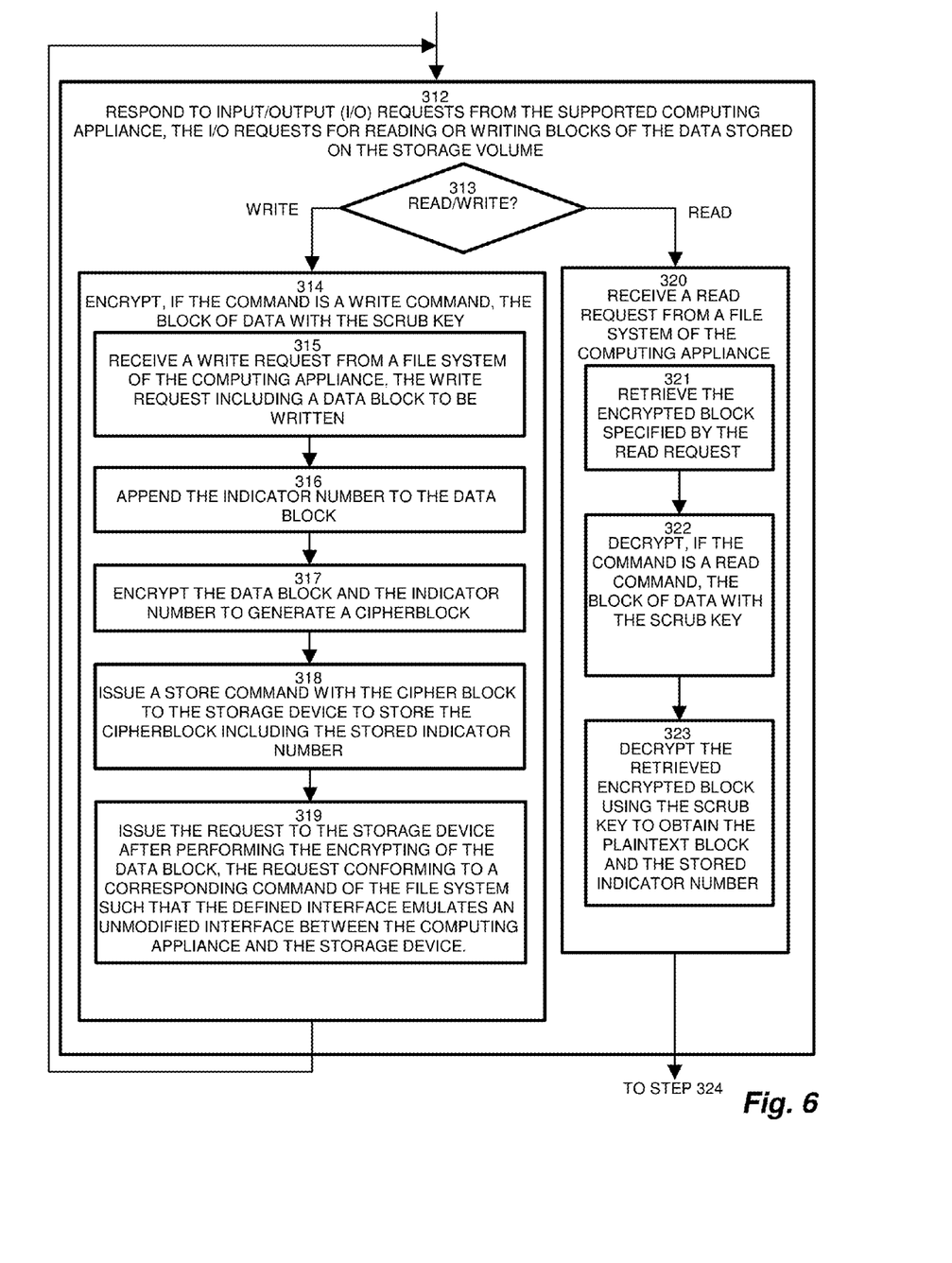
Figure 7:
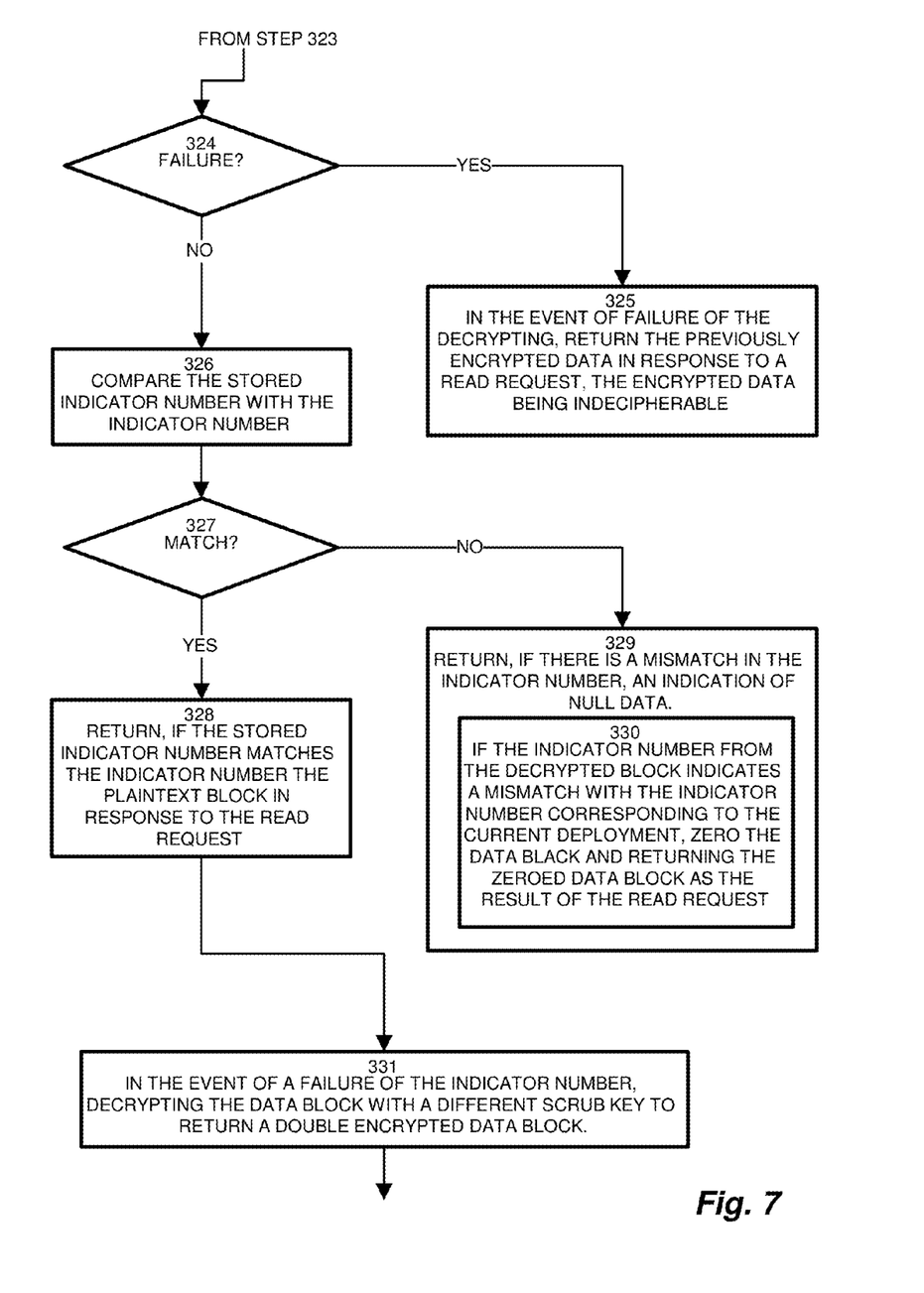
Figure 8:
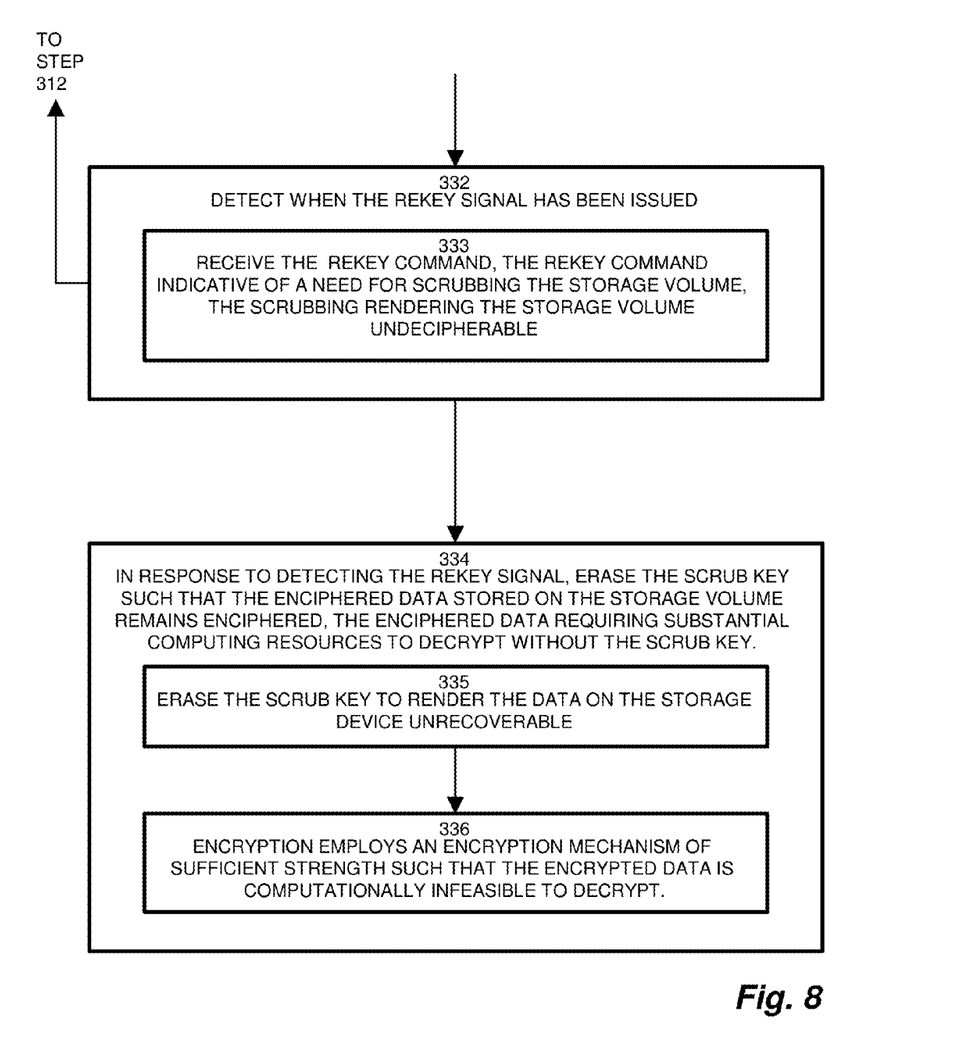

FIG. 3 is a block diagram of a computing device 110 employing the scrub controller 150 interfaced between the storage device 130. Referring to FIGS. 1 and 3, the storage device 130 includes a storage volume 132, such as a disk drive or other block structured storage medium having addressable blocks of storage for reading and writing from the computing appliance 120. The storage volume 132 includes data blocks 134-1 ... 134-3 (134 generally) representing an atomic unit of data exchanged with the computing appliance 120. Each of the data blocks 134 includes a data portion 136 and an indicator portion 138. The indicator portion 138 is a label indicative of a particular deployment of the storage volume, discussed further below, and may be incremented each deployment (scrub cycle) or may follow an alternate pattern.

Briefly, according to a scrubbable read/write mechanism that will be discussed further below, the scrub controller 150 encrypts each block 134 upon writing to the storage volume 132, and decrypts the block 134 upon retrieval. When the data blocks 134 are to be scrubbed, the key 159 used to encrypt and decrypt the blocks 134 is erased. Since the key generation and subsequent encryption/decryption are self contained in the scrub controller 150 via separate memory and power supply from the supported computing appliance 120, the key 159 never leaves the scrub controller 150. The scrub key remains in the scrub controller and is therefore inaccessible to retrieval since the scrub controller 150 does not share memory or access paths with the computing device 110 and is thus electronically separate from the supported computing appliance.

The scrub controller 150 includes a command blocker 153 for receiving and identifying read and write commands 140 from the computing appliance 120, a read sanitizer 154, and an encrypter 156. The read sanitizer 154 evaluates indicator numbers stored in the indicator portion 138, and zeroes the block 134 in question if a previous deployment is indicated. The encrypter 156 performs encryption and decryption on blocks 134 written to and read from (respectively) the storage volume 132. A key generator 158 generates both a key value 163 to be stored as the scrub key 159 for encrypting and decrypting, and the rekey indicator number 164 to be stored as the indicator number (IN) 157 associated with a current deployment. The interface 152 emulates the storage device 130 such that it receives the commands 140 (i.e. read and write a block of data) from the computing appliance, performs the encryption/decryption, and issues instructions to the storage device 130 for fetching or storing the data block 134.

In operation, for a write operation, the command blocker 152 receives a write command 160, including a write data block 134', and scrutinizes it to ensure it is a permitted command. The command blocker 152 disallows commands that might provide insight into the scrub operations and manner of storage on the storage volume 132. The read sanitizer 154 appends the indicator number 157 to the block 134' to form a deployed block 162. The indicator number 157' is stored with the block 134' and identifies this particular deployment of the storage volume 132. The indicator number 157 is changed each time the storage volume 132 is scrubbed for redeployment. If a successive deployment somehow experiences a failed decryption, the indicator number 157 will act as a failsafe mechanism as it will not match with the successive deployment. Following appending of the indicator number 157', the encrypter 156 encrypts the deployed block 162 with the key 159 to form a ciphertext block 164, and the storage device 130 stores the ciphertext block 164 in a disk sector as block 134-N including the data portion 136 and the indicator number 138 in encrypted form.

For a read operation, the computing appliance 120 issues a read command 170. After screening by the command blocker 152, the storage device 130 reads the block 134 from the storage volume, and returns a ciphertext read response 172 including the data portion 136 and indicator number 138 in ciphertext form. The encrypter 156 decrypts the ciphertext read response 172 using the key 159 to yield the plaintext (unencrypted) data block 134" and the rekey indicator number 138' that was stored with the block 134". The read sanitizer 154 receives the decrypted response 174 and compares the rekey indictor number 138' with the indicator number 157 for the current deployment to verify that the block 134" belongs with the current deployment. If the indicator number check fails, the read sanitizer 154 zeroes the block 134" to indicate scrubbing has occurred. It should be noted that since a new deployment instance generates a different scrub key 159 and indicator number 157, proper operation would also result in the different encryption key 159 being used than that with which the block 134' was stored under, hence the block 134" would be double encrypted and unintelligible anyway. The duality of the indicator number 157 and the key 159 effects a failsafe approach and additional verifiability since the returned block 134" is zeroed (as an alternative to returning a double encrypted block 134" which could cause unpredictable operation at the computing appliance 120). If the check passes, the read sanitizer 154 returns the unencrypted data block 134" to the computing appliance as a read response 176.

FIGS. 4-8 are a flowchart of the scrub controller performing data access in anticipation of a scrub operation. Referring to FIGS. 1 and 3-8, prior to I/O operations occurring, the interface 152 is defined between the computing appliance 120 and the storage device 130, as depicted at step 300. The scrub controller 150 and corresponding interface 152 is typically disposed into the physical path of the I/O bus 112 between the CPU 122 and the storage device 130, so as to intercept all commands 140 and issue all corresponding responses 142. In particular configurations, the interface 152 is sufficiently compact in size such that it fits within the unmodified cabinet of the laptop, PC or other device defining the computing device 110, such as an FPGA (field programmable gate array) configured for performing instructions as defined herein. The encrypter 156 identifies a scrub key 159 from the key generator 160, in which the scrub key 159 is for cryptographically enciphering data stored on the storage volume 132, as depicted at step 301. The scrub key 159 is responsive to the rekey signal 125 indicative of a need to delete the enciphered data, as will be described further below.

The scrub controller 150 may store the scrub key 159 in an active or passive manner, generally referring to the volatility of the key. Accordingly, a check is performed, as shown at step 302. If the scrub controller is active, then the scrub key is maintained in a volatile memory, such that the power maintains the scrub key persistently for a deployment of the storage volume 132, and the rekey signal 125 includes cutting power to the memory for erasing the scrub key 159, as shown at step 303. Alternatively, in a passive arrangement, the scrub key 159 is maintained in non-volatile memory, such that the scrub key maintained persistently through power cycles, and the rekey signal includes obliterating the non-volatile memory to erase the scrub key, such as by overwriting the memory storing the key 159, as depicted at step 304. The active approach maintains a more fail safe approach towards security, as interruption of power renders the data unrecoverable, while the passive approach favors data persistence by maintaining the key 159 in an EPROM or similar memory that is persistent through power cycles.

The scrub controller 150 stores the scrub key 159 separate from the memory space 124 of the processor 122 supporting the computing appliance 120, therefore rendering the scrub key 159 inaccessible via instructions executed by the processor 122, as shown at step 305. This includes storing the scrub key 159 in an electronically separate memory from the computing appliance 120 and where it is unavailable by external discovery, as depicted at step 306. The separate memory has separate power from the computing appliance 120 such that the scrub key 159 is unaffected by power fluctuation and memory accesses of the computing appliance 120, and the scrub key 159 is therefore inaccessible to malware on the computing appliance 120 via electronic separation between the scrub key 159 and memory 124 of the computing appliance 120. Accordingly, no code (program instructions) executed on the computing appliance 120 can manipulate an electronic pathway to the scrub key 159, thus malware and other externally introduced programs (whether intended or unintended) can perform a set of instructions that reads, writes, or otherwise manipulates the scrub key 159. Further, since the scrub key is both generated and employed within the scrub controller 150, the scrub key 159 never leaves the scrub controller and therefore cannot be identified by sniffing or otherwise observing communications to or from the scrub controller 150 or the computing appliance 120.

In an alternate arrangement, the scrub controller 150 maintains the key 159 in a password or PIN based table of keys. In this manner, disks may be allocated or shared securely by multiple users 121, each with their own password, or the same storage volume 132 may be partitioned into multiple volumes, each owned by a different user. Other suitable password control may be apparent to those of skill in the art. For example, the scrub controller 150 may enforce a two/multi-person control policy over the storage volume 132 by requiring 2 or more people to each provide a unique input to open up a part of a key.

In conjunction with the scrub key 159, the key generator 158 also generates an indicator number, such that the indicator number (IN) 157 defines a deployment instance of the storage device 130 having the storage volume 132. A modification of the indicator number 157 therefore defines a new deployment instance in which data from previous deployments is rendered indecipherable, as depicted at step 307.

The scrub key 159 and the indicator number 157 remain unchanged during a deployment of the storage volume 132. During a deployment, the scrub controller responds to I/O requests issued from the computing appliance 120 to the storage device 130. Accordingly, the scrub controller 150 receives via the interface, a request 140 from a file system of the computing appliance 120, as depicted as step 308. This includes, at step 309, receiving a command 140 from the computing appliance 120 via the interface 152, in which the interface 152 defines a set of permitted commands for fulfillment from the storage device 130. In addition to fulfilling the I/O commands on behalf of the computing appliance 120, the interface 152, in conjunction with the command blocker 153, also limits the permissible I/O commands such that the existence of the scrub controller 150 is not determinable via software interrogation from an executing program. In other words, the interface 152 appears to the computing appliance 120 to be an unmodified storage device 130. The encrypted operation of the scrub controller 150 is transparent to the supported computing device 130. Upon receipt, the command blocker 153 evaluates the command 140 to identify if the command is permitted, as depicted at step 310. Ordinarily, only read 170 and write 160 commands would be deemed permitted, and thus the command blocker 153 rejects the command if unpermitted, as shown at step 311. In response to an unpermitted command 140, the scrub controller may return an apparently normal but inaccurate response 142 so as not to alert the caller to the disallowed nature of the command 140 and possibly alert as to the presence of the scrub controller 150. For example, a status inquiry about the number of sectors on the storage volume 132 may evoke a predetermined inaccurate count, rather than indicate an error.

If the command 140 is permitted, then the scrub controller 150 responds to the input/output (I/O) request 140 from the supported computing appliance 120, in which the I/O requests are for reading or writing blocks 134 of the data stored on the storage volume 132, as disclosed at step 312. A check is performed, at step 313, to identify a read or write command. The scrub controller 150 encrypts, if the command 140 is a write command 160, the block of data 134' with the scrub key 159, as depicted at step 314. This includes, at step 315, receiving the write request 160 from the file system of the computing appliance 120, such that the write request 160 includes a data block 134' to be written. The read sanitizer 154 appends the indicator number 157' to the data block 134', as depicted at step 316, and the encrypter encrypts the plaintext write block 162, including the data block 134' and the indicator number 157', to generate a cipherblock 164, as disclosed at step 317. The interface 152 issues a store command with the cipher block 164 to the storage device 130 to store the cipherblock including the stored indicator number 157', as depicted at step 318. This includes issuing the request to the storage device 130 after performing the encrypting of the plaintext block 162, such that the request 164 conforms to a corresponding command of the file system, in which the defined interface 152 emulates an unmodified interface between the computing appliance 120 and the storage device 130, as depicted at step 319. The interface 152 therefore emulates the store command so that the scrub controller 150 is transparent to the storage device 130. The cipherblock 164 may be larger then the unencrypted data block 134' due to the addition of the indicator number 157', for example the indicator number may add 8 bytes to a 512 byte data block to yield a 520 byte cipherblock 164. The storage volume 132 may be formatted to accommodate the increase, or may use other mechanisms such as double sectors or compression.

Upon receiving a read request 142 from a file system of the computing appliance 130, as depicted at step 320, the interface 152 retrieves the encrypted block 172 specified by the read request, as shown at step 321. The encrypter 159 decrypts, since the command 140 is a read command 170, the block of data 134 with the scrub key 159, at step 322, thus decrypting the retrieved encrypted block 172 using the scrub key 159 to obtain the plaintext block 174 including the retrieved data block 134" and the stored indicator number 138', as shown at step 323.

The duality of encrypting the data block 134 with the appended indicator number 157 is illustrated by the following steps in which a failure of either nonetheless renders the data block 134 secure. In the event of failure of the decrypting, at step 324, the encrypter 156 returns the previously encrypted data 164 in response to a read request 162, the encrypted data being indecipherable, as depicted at step 325. Thus, once the scrub controller 150 writes the cipherblock 164, data is effectively obscured absent accurate decrypting with the corresponding scrub key 159 with which it was written. If encryption succeeds, then the read sanitizer 154 compares the stored indicator number 157 with the indicator number 138' from the retrieved ciphertext block 172. The read sanitizer 154 compares the indicator number 157 of the current deployment with the stored indicator number 138' corresponding to the retrieved, decrypted block 174, as disclosed at step 326, if there is a mismatch (step 327) in the indicator number, returns an indication of null data, as depicted at step 329. The indicator number 157 is a label, or sequence number of the current deployment; a mismatch of the indicator number 157 indicates retrieval of a block 134" corresponding to a previous deployment. Accordingly, if the indicator number 138' from the decrypted block 174 indicates a mismatch with the indicator number 157 corresponding to the current deployment, the read sanitizer 154 zeroes the data block 134" and returns the zeroed data block as the result 176 of the read request, as depicted at step 330.

The read sanitizer 154 returns, if the stored indicator number 157 matches the indicator number 138', the plaintext block 174 in response to the read request. In either case, if the indicator number check at step 327 fails to indicate a mismatch, the encrypter 156 would employ the previous key 159, thus in the event of a failure of the indicator number 157, the encrypter 156 would have decrypted the data block 134 with a different scrub key to return a double encrypted data block as the result 176, thus returning indecipherable data.

In further detail, the duality of the encryption and the indicator number provide a failsafe approach by accommodating failure of either. For example, envision a particular case in which the storage device is disposed in a secure area, where the users of the disk do not have physical access to it (A much more constrained environment than typical deployment). If the goal is to prevent a new user from reading data that an old user put on the disk, the read sanitizer 154 and the encrypter 156 are each sufficient. If a redeployment changes the indicator number 157 in the scrub controller 150 so it is different from the one written to the disk 138 by the old user, then any read performed will return a sector full of zeros because the indicator number 138 on the sector does not match the indicator number 157 the read sanitizer 154 is expecting. If the key generator 160 changes the scrub key 159, what is read back into the scrub controller will be random-looking data (a sector that has been encrypted with one key then decrypted with a different one). In particular, the indicator number 138 will be different since it will have been decrypted with the wrong key. Again, the scrub controller 150 will return a sector 176 full of zeros because the indicator numbers don't match.

In this manner, either of the two subsystems could fail but the data on the disk would still be protected from read access by the new user. If the encrypter 156 stops encrypting and simply acts as a pass-through, changing the indicator number 157 will prevent the unencrypted data from being passed back to the new user. Likewise if the read sanitizer 154 starts passing every sector 174 through whether it has the correct indicator number 138' or not, the user will see non-zero data coming back but it will be effectively double encrypted (encrypted with one key and decrypted with a different one). Again, the old user's data will be protected from access by the new user. The encrypted data without an identifiable key is deemed unrecoverable and much faster and more efficient via conventional mechanisms that physically overwrite 4 times to avoid electron microscope detection, relying on ram decay, and other extreme measures.

Operation continues in this manner with the interface 152 fielding requests 140 and delivering responses 142 until a rekey signal 125 is issued indicating a need to scrub the storage volume 132. Accordingly, the scrub controller 150 detects when the rekey signal 125 has been issued, as depicted at step 322. This includes receiving the rekey command 125 by any suitable mechanism, such as a physical toggle switch, remote/wireless communication, or power termination, in which the rekey command is indicative of a need for scrubbing the storage volume 132 in which the scrubbing renders the storage volume undecipherable, as depicted at step 333.

In response to detecting the rekey signal 125, the scrub controller erases the scrub key 159 such that the enciphered data 136 stored on the storage volume 132 remains enciphered, in which the enciphered data requires substantial computing resources to decrypt without the scrub key 159, depending on the strength of the underlying encryption schemes, as shown at step 334. The encrypter 156 erases the scrub key 159 to render the data on the storage device unrecoverable, as indicated at step 335. In the example shown, the encrypter 156 employs an encryption mechanism of sufficient strength such that the encrypted data is computationally infeasible to decrypt, as depicted at step 336. By way of example, such encryption operations include but are not limited to DES 3, DES 56, AES 256, as are known in the art, however the particular operation may be varied to suit the desired security level and available computing resources.

If a successive deployment is called for, the key generator 160 issues another scrub key 159 and indicator number 157, which need not be sequential, and employs these values as described above for the new deployment.

Those skilled in the art should readily appreciate that the programs and methods for implementing a cryptographically scrubbable storage device as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example as in an electronic network such as the Internet or telephone modem lines. Such delivery may be in the form of a computer program product having a computer readable storage medium operable to store computer program logic embodied in computer program code encoded thereon, for example. The operations and methods may be implemented in a software executable object or as a set of instructions embedded in an addressable memory element. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for implementing a cryptographically scrubbable storage device has been particularly shown and described with references to embodiments thereof, it will be understood by those skilled in the art that various changes in form and details may be made therein without departing from the scope of the invention encompassed by the appended claims.

What is claimed is:

1. A method of scrubbing a storage volume, the storage volume providing data storage support for a computing appliance, the method comprising:
   identifying a scrub key, the scrub key cryptographically enciphering data stored on the storage volume, the scrub key responsive to a rekey signal, the rekey signal indicative of a need to delete the enciphered data;
   generating an indicator number, the indicator number defining a deployment instance of the storage volume, a modification of the indicator number defining a new deployment instance such that data from previous deployments is rendered indecipherable;
   storing the scrub key separate from a memory space of a processor supporting the computing appliance, the scrub key inaccessible via instructions executed by the processor;
   responding to input/output (I/O) requests from the supported computing appliance, the I/O requests for reading or writing blocks of the data stored on the storage volume, responding further including:
      receiving a write request from a file system of the computing appliance, the write request including a data block to be written;
      appending the indicator number to the data block
      encrypting the data block and the indicator number to generate a cipherblock; and
      issuing a store command with the cipher block to the storage volume to store the cipherblock including the stored indicator number;
      receiving a read request from a file system of the computing appliance;
      retrieving the encrypted block specified by the read request;
      decrypting the retrieved encrypted block using the scrub key to obtain the plaintext block and the stored indicator number;
      comparing the stored indicator number with the indicator number;
      returning, if the stored indicator number matches the indicator number the plaintext block in response to the read request; and
      returning, if there is a mismatch in the indicator number, an indication of null data;
   detecting when the rekey signal has been issued; and
   in response to detecting the rekey signal, erasing the scrub key such that the enciphered data stored on the storage volume remains enciphered, the enciphered data requiring substantial computing resources to decrypt without the scrub key.

2. The method of claim 1 further comprising storing the scrub key in an electronically separate memory from the computing appliance and unavailable by external discovery, the separate memory having separate power from the computing appliance, the scrub key unaffected by power fluctuation and memory accesses of the computing appliance, the scrub key inaccessible to malware on the computing appliance vie electronic separation between the scrub key and memory of the computing appliance.

3. The method of claim 1 further comprising:
   defining an interface between the computing appliance and the storage device, and
   receiving, via the interface, a request from a file system of the computing appliance; and
   issuing the request to the storage device after performing the encrypting of the data block, the request conforming to a corresponding command of the file system wherein the defined interface emulates an unmodified interface between the computing appliance and the storage device.

4. The method of claim 3 wherein responding further comprising:
   receiving a command from the computing appliance via the interface, the interface defining a set of permitted commands for fulfillment from the storage device;
   evaluating the command to identify if the command is permitted;
   rejecting the command if unpermitted;
   encrypting, if the command is a write command, the block of data with the scrub key; and
   decrypting, if the command is a read command, the block of data with the scrub key.

5. The method of claim 1 further comprising, in the event of failure of the decrypting, returning the previously encrypted data in response to a read request, the encrypted data being indecipherable; and
   in the event of a failure of the indicator number, decrypting the data block with a different scrub key to return a double encrypted data block.

6. The method of claim 5 if the indicator number from the decrypted block indicates a mismatch with the indicator number corresponding to the current deployment, zeroing the data black and returning the zeroed data block as the result of the read request.

7. The method of claim 1 further comprising:
receiving the rekey command, the rekey command indicative of a need for scrubbing the storage volume, the scrubbing rendering the storage volume undecipherable; and
erasing the scrub key to render the data on the storage device unrecoverable.

8. The method of claim 7 wherein the scrub key is maintained in a volatile memory, the power maintaining the scrub key persistently for a deployment of the storage volume, and the rekey signal includes cutting power to the memory for erasing the scrub key.

9. The method of claim 7 wherein the scrub key is maintained in non-volatile memory, the scrub key maintained persistently through power cycles, and the rekey signal includes obliterating the non-volatile memory to erase the scrub key.

10. The method of claim 7 wherein the encryption employs an encryption mechanism of sufficient strength such that the encrypted data is computationally infeasible to decrypt.

11. A scrub controller for cryptographically scrubbing a storage volume comprising:
an encrypter for encrypting data stored on a storage volume, the storage volume responsive to a computing appliance for data storage and retrieval;
a scrub key, the scrub key responsive to the encrypter for cryptographically enciphering data stored on a storage volume, the scrub key responsive to a rekey signal, the rekey signal indicative of a need to delete the enciphered data, the scrub key configured for storage separate from a memory space of a processor supporting the computing appliance, the scrub key inaccessible via instructions executed by the processor;
a key memory configured for storing the scrub key, the key memory defined by an electronically separate memory from the computing appliance unavailable by external discovery, the separate memory having separate power from the computing appliance, the key memory unaffected by power fluctuation and memory accesses of the computing appliance, the key memory inaccessible to malware on the computing appliance vie electronic separation between the scrub key and memory of the computing appliance;
an interface to a supported computing appliance, the interface configured to respond to input/output (I/O) requests from the supported computing appliance, the I/O requests for reading or writing blocks of the data stored on the storage volume;
a rekey interface for detecting when the rekey signal has been issued, the scrub controller responsive to the rekey signal, and configured to erase the scrub key such that the enciphered data stored on the storage volume remains enciphered, the enciphered data requiring substantial computing resources to decrypt without the scrub key; and
a read sanitizer configured for storing an indicator number, the indicator number defining a deployment instance of the storage device, a modification of the indicator number defining a new deployment instance such that data from previous deployments is rendered indecipherable, the interface configured to:
receive a read request from a file system of the computing appliance;
retrieve the encrypted block specified by the read request;
decrypt the retrieved encrypted block using the scrub key to obtain the plaintext block and the stored indicator number;
compare the stored indicator number with the indicator number;
return, if the stored indicator number matches the indicator number the plaintext block in response to the read request; and
return, if there is a mismatch in the indicator number, an indication of null data.

12. The controller of claim 11 wherein the interface is configured to:
receive a write request from a file system of the computing appliance, the write request including a data block to be written;
append the indicator number to the data block
encrypt the data block and the indicator number to generate a cipherblock; and
issue a store command with the cipher block to the storage device to store the cipherblock including the stored indicator number.

13. The controller of claim 11 wherein the interface is transparent between the computing appliance and the storage device, the interface further configured to:
receive a request from a file system of the computing appliance and
issue the request to the storage device after performing the encrypting of the data block, the request conforming to a corresponding command of the file system wherein the defined interface emulates an unmodified interface between the computing appliance and the storage device.

14. The controller of claim 11 further comprising a command blocker, the command blocker configured to:
receive a command from the computing appliance via the interface, the interface defining a set of permitted commands for fulfillment from the storage device;
evaluate the command to identify if the command is permitted;
reject the command if unpermitted;
encrypt, if the command is a write command, the block of data with the scrub key; and
decrypt, if the command is a read command, the block of data with the scrub key.

15. The controller of claim 11 wherein the key memory further comprises a mapping of passwords and a plurality of scrub keys, each password corresponding to a user and indicative of a scrub key associated to the user, the encrypter responsive to the password for invoking the corresponding script key for encrypting the requests on behalf of the user.

16. A computer program product having computer program code encoded as a set of instructions on a non-transient computer readable storage medium that, when executed by a processor, cause the computer to perform a method for cryptographically scrubbing a computer storage device, the method comprising:
identifying a scrub key, the scrub key cryptographically enciphering data stored on a storage volume, the scrub key responsive to a rekey signal, the rekey signal indicative of a need to delete the enciphered data;
storing the scrub key an electronically separate memory from the computing appliance and unavailable by external discovery, the scrub key inaccessible via instructions executed by a processor on the computing appliance;
generating an indicator number, the indicator number defining a deployment instance of the storage device, a modification of the indicator number defining a new deployment instance such that data from previous deployments is rendered indecipherable;

responding to input/output (I/O) requests from the supported computing appliance, the I/O requests for reading or writing blocks of the data stored on the storage volume, the blocks of data encrypted with the scrub key and appended with the indicator number, responding further including:
  receiving a write request from a file system of the computing appliance, the write request including a data block to be written;
    appending the indicator number to the data block
    encrypting the data block and the indicator number to generate a cipherblock; and
    issuing a store command with the cipher block to the storage volume to store the cipherblock including the stored indicator number;
  receiving a read request from a file system of the computing appliance;
    retrieving the encrypted block specified by the read request;
    decrypting the retrieved encrypted block using the scrub key to obtain the plaintext block and the stored indicator number;
    comparing the stored indicator number with the indicator number;
    returning, if the stored indicator number matches the indicator number the plaintext block in response to the read request; and
returning, if there is a mismatch in the indicator number, an indication of null data;
detecting when the rekey signal has been issued; and
in response to detecting the rekey signal, erasing the scrub key such that the enciphered data stored on the storage volume remains enciphered, the enciphered data requiring substantial computing resources to decrypt without the scrub key.

* * * * *